United States Patent Office

Re. 27,328
Reissued Apr. 11, 1972

27,328

THERMOSETTING RESINS DERIVED FROM N-3-OXOHYDROCARBON-SUBSTITUTED ACRYLAMIDES

John Wesley Forsberg, Mentor-on-the-Lake, Ohio, assignor to The Lubrizol Corporation, Wickliffe, Ohio No Drawing. Original No. 3,518,326, dated June 30, 1970, Ser. No. 826,006, May 19, 1969, which is a continuation-in-part of Ser. No. 619,565, Mar. 1, 1967. Application for reissue Oct. 9, 1970, Ser. No. 79,716
Int. Cl. C08g *37/38*
U.S. Cl. 260—828 21 Claims

Matter enclosed in heavy brackets [ ] appears in the original patent but forms no part of this reissue specification; matter printed in italics indicates the additions made by reissue.

ABSTRACT OF THE DISCLOSURE

A thermosetting polymeric composition is prepared by the reaction of an N-3-oxohydrocarbon-substituted acrylamide (preferably diacetone acrylamide) with an aliphatic aldehyde containing no more than 4 carbon atoms, preferably formaldehyde, in a strongly alkaline medium. While the structure of the composition is not known, it is believed to be a crosslinked product formed by hydroxymethylation and subsequent condensation through the hydroxymethyl groups. The acrylamide olefinic bonds are apparently unaffected. These compositions are useful either alone or in combination with unsaturated polyesters, for the preparation of thermosetting molding powders. They may also be used to replace polyesters (in full or in part) in typical applications such as production of resin-impregnated fiber glass mats and various kinds of laminates.

This application is a continuation-in-part of copending applications Ser. No. 619,565, filed Mar. 1, 1967 and Ser. No. 793,168, filed Jan. 22, 1969, both abandoned.

This invention relates to polymeric compositions of matter and a method for their preparation. More particularly it relates to *water-insoluble* thermosetting compositions prepared by the method which comprises reacting, in a strongly alkaline medium, an aliphatic aldehyde containing no more than four carbon atoms with a monomeric N-3-oxohydrocarbon-substituted acrylamide of the formula

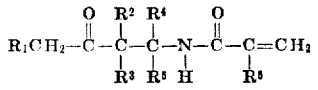

wherein each of $R^1$, $R^2$, $R^3$, $R^4$ and $R^5$ is hydrogen or a hydrocarbon radical, and $R^6$ is hydrogen or a lower alkyl radical.

As used herein, the term "hydrocarbon radical" includes aliphatic, cycloaliphatic and aromatic hydrocarbon radicals, It also includes substantially hydrocarbon radicals; that is, radicals containing substituents which do not materially alter the character or reactivity of the radical. Illustrative of such substituents are halogen, ether, ester and nitro groups. Thus, $R^{1-5}$ may be, for example, methyl, ethyl, n-butyl, sec-butyl, n-decyl, cyclopentyl, cyclohexyl, phenyl, benzyl, toluyl, 2-chloro-1-butyl, p-nitrophenyl, o-chlorophenyl and the like.

The radical $R^6$ is preferably hydrogen but may in some instances be a lower alkyl radical; that is, an alkyl radical containing no more than ten carbon atoms. If $R^6$ is alkyl, it is preferably methyl.

The preparation of N - 3 - oxohydrocarbon-substituted acrylamides is described in U.S. Pats. 3,277,056 and 3,425,942. Examples of these compounds are N-(1,1-dimethyl-3-oxobutyl)-acrylamide, hereinafter referred to as diacetone acrylamide; N-(1,1-dimethyl-3-oxobutyl)methacrylamide, hereinafter referred to as diacetone methacrylamide; and N-(1,3-diphenyl-1-methyl-3-oxopropyl)acrylamide, hereinafter referred to as diacetophenone acrylamide. In the preferred compounds, $R^{1-5}$ are hydrogen or lower alkyl radicals; the particularly preferred compound is diacetone acrylamide and the remainder of this specification will deal specifically with it. However, it is to be understood that any of the other N-3-oxohydrocarbon-substituted acrylamides may be substituted therefor.

Typical of the aliphatic aldehydes which may be used for preparing the compositions of this invention are formaldehyde, acetaldehyde, propionaldehyde, and the butyraldehydes. For reasons of convenience, economy and ease of preparation, formaldehyde is preferred. It is ordinarily employed as an aqueous solution, but a reversible polymer such as trioxane or paraformaldehyde is also suitable.

The molar ratio of aldehyde to diacetone acrylamide in the mixtures which lead to the compositions of this invention is usually between about 1:1 and 8:1. The 1.7:1 and 2:1 products have been found particularly useful for the purposes more fully described hereinafter.

The compositions of this invention are prepared by merely mixing diacetone acrylamide and the aldehyde in the presence of a strongly alkaline reagent and in a suitable solvent. Alkaline reagents which may be used include sodium hydroxide, potassium hydroxide and quaternary ammonium hydroxides such as tetramethylammonium hydroxide. Weak bases such as ammonium hydroxide are not suitable.

The compositions of this invention are formed at room temperature if the reaction mixture is allowed to stand for a suitable length of time. It is frequently convenient, however, to heat the mixture to a temperature up to about 125° C. in order to shorten the necessary reaction time. An intermediate product, comprising a *water-soluble* hydroxyalkyl derivative of diacetone acrylamide or a mixture of *water-soluble* mono- and poly-(hydroxyalkyl) derivatives, is frequently formed if the concentration of alkali is less than about 5% by weight of the aldehyde. This intermediate which is disclosed and claimed in copending applications Ser. No. 751,715, filed Aug. 12, 1968, and Ser. No. 833,162, filed June 13, 1969, and which forms no part of the present invention, can be converted to the desired composition by merely heating or agitating the mixture for an additional period of time.

If the solvent is water, the desired product precipitates from solution as it is formed. If a polar organic solvent such as an alcohol or ether alcohol is used, the product may remain in solution but can be easily precipitated by the addition of water. In general, no purification of the solid product is necessary.

The precise molecular structures of the compositions of this invention have not been determined. It is known that the first step in their formation is by hydroxyalkylation of the positions alpha to the oxo group in the N-3-oxohydrocarbon-substituted acrylamide. This is believed to be followed by condensation to form ether linkages between successive acrylamide units either directly or through an alkylene group obtained from another molecule of the aldehyde. At any rate, it appears that the olefinic bond in the acrylamide is not affected by the reaction, since it is available for polymerization as described hereinafter. The molecular weight of the products is generally such as would be expected of a substance containing about 4–8 diacetone acrylamide units connected by molecular bridges.

The preparation of the compositions of this invention is illustrated by the following examples. All parts, percentages and proportions are by weight.

EXAMPLE 1

A solution of 92 parts of diacetone methacrylamide, 76 parts of 40% aqueous formaldehyde solution and 15 parts of 33% aqueous sodium hydroxide solution in 530 parts of water is allowed to stand for 20 hours at room temperature. The precipitate which forms is removed by filtration, washed several times with water, and allowed to dry at room temperature. There is obtained a 2:1 (molar ratio) reaction product of formaldehyde and diacetone methacrylamide.

EXAMPLE 2

To a solution of 354.9 parts (2.1 moles) of diacetone acrylamide in 320.3 parts of water is added rapidly, at 50° C. and under nitrogen, a solution of 10.5 parts (0.263 mole) of sodium hydroxide in 11.3 parts of water. The mixture is heated to 63° C. and then gradually to 76° C. over two hours as a mixture of 107.2 parts (3.57 moles) of paraformaldehyde and 10.6 parts of water is added gradually. Heating is continued for 1½ hours; then the aqueous layer is decanted from the precipitated solids and the solids are washed with water and filtered. The filtration residue is dried for three hours at 50–80° C. The dried 1.7:1 formaldehyde-diacetone acrylamide product has a bromine number of 88.

EXAMPLE 3

A mixture of 680 parts of diacetone acrylamide, 608 parts of 40% aqueous formaldehyde solution, 120 parts of 33% aqueous sodium hydroxide solution and 4240 parts of water is heated in a water bath at 46° C. for five hours. A yellowish-white powder precipitates and is filtered and dried. There is obtained 645 parts of a 2:1 reaction product of formaldehyde and diacetone acrylamide, containing 6.68% nitrogen and having a bromine number of 87.

EXAMPLE 4

To a solution of 3360 parts of diacetone acrylamide and 3288 parts of 37% aqueous formaldehyde solution in 3765 parts of water is added, at room temperature 390 parts of 50% aqueous sodium hydroxide solution over two minutes. An exothermic reaction occurs with the formation of a precipitate. The mixture is cooled externally and becomes clear after about five minutes; after about 10 minutes precipitation begins again (solution temperature 60° C.). The mixture is held at about 58–60° C. by external cooling for about 20 minutes and then is heated to 70° C. for about 20 minutes. It is then cooled and filtered, and the solid product is washed with water and dried for six days at 60–65° C. There is obtained 3540 parts of 2:1 formaldehyde-diacetone acrylamide reaction product having a bromine number of 83 and a number average molecular weight of 500.

EXAMPLE 5

To a solution of 560 parts of diacetone acrylamide and 548 parts of 37% aqueous formaldehyde solution in 627 parts of diethylene glycol dimethyl ether is added 72 parts of a 50% aqueous solution of sodium hydroxide with stirring. An exothermic reaction occurs and the temperature rises to about 60° C. over 2–3 minutes, and then to 100° C. The reaction mixture is cooled externally to avoid too severe a temperature increase. The hazy reddish liquid thus obtained is poured into a large volume of cold water, with stirring, whereupon the diacetone acrylamide-formaldehyde reaction product precipitates. It is removed by filtration, washed with water and dried in an oven at 60° C. for several days. The 2:1 formaldehyde-diacetone acrylamide product contains 6.64% nitrogen and has a bromine number of 77 and a number average molecular weight of 833.

EXAMPLE 6

A solution of 600 parts (3.55 moles) of diacetone acrylamide in 300 parts of water is stirred as 36.1 parts of a 50% aqueous sodium hydroxide solution (0.44 mole of sodium hydroxide) is added over 5 minutes. The solution is heated to 63° C., and 237 parts (7.19 moles) of paraformaldehyde and 254 parts of isopropyl alcohol are added simultaneously over about 2 hours, while the temperature is gradually increased to 80° C.

The reaction mixture is circulated via a rotary pump while 3000 parts of water is added over 22 minutes. An additional 30 parts of isopropyl alcohol is then added and the mixture is centrifuged. The solid, resinous product is collected and dried at 88° C. for 3 hours. The desired 2.04:1 formaldehyde-diacetone acrylamide product is obtained.

EXAMPLE 7

The procedure of Example 5 is repeated, except that the diacetone acrylamide is replaced by an equimolar amount of N - (1,3-diphenyl-1-methyl-3-oxopropyl)acrylamide. A similar product is obtained.

EXAMPLE 8

A solution of 1275 parts of diacetone acrylamide, 2280 parts of 40% aqueous formaldehyde and 225 parts of 33% aqueous sodium hydroxide in 750 parts of water is heated at 46° C. in a water bath for 15 hours. The precipitate which forms is removed by filtration, washed with water and dried in vacuum. The 4:1 formaldehyde-diacetone acrylamide product is obtained in a yield of 780 parts. It contains 5.44% nitrogen and has a bromine number of 76.

EXAMPLE 9

To a mixture of 312 parts of diacetone acrylamide, 600 parts of 37% aqueous formaldehyde and 100 parts of water is added 20 parts of 50% aqueous sodium hydroxide; a temperature rise from 20° C. to 25° C. is noted. Additional increments of 50% aqueous sodium hydroxide (6 parts, 10 parts, 16 parts, 74 parts) are added slowly so as to control the exothermic reaction at a temperature below 49° C. After the addition of the last increment, the mixture is heated to 71° C.; the total reaction time is 2½ hours. The solid product is filtered, washed with water and dried for five days at 60° C. The product is a 4:1 formaldehyde-diacetone acrylamide reaction product having a molecular weight of 902.

EXAMPLE 10

To a solution of 3430 parts of diacetone acrylamide and 6600 parts of 37% aqueous formaldehyde in 1000 parts of water is added 280 parts of 50% aqueous sodium hydroxide over one minute. The reaction mixture is cooled externally as an additional 200 parts of sodium hydroxide solution is added; the temperature is then increased to 60–65° C. and held there for 15 minutes. The total reaction time is about 1¼ hours. The mixture is then cooled and filtered and the precipitate is washed with water, dried for 10 days at 60–65° C., and ground into a fine powder in a ball mill. The 4:1 formaldehyde-diacetone acrylamide reaction product has a bromine number of 67.

EXAMPLE 11

A 6:1 formaldehyde-diacetone acrylamide product is prepared by adding 50% aqueous sodium hydroxide to a solution of 366 parts of diacetone acrylamide and 1050 parts of 37% aqueous formaldehyde in 150 parts of water. The sodium hydroxide solution is aded in increments so as to control the reaction temperature—30 parts, then 45 parts, and finally 120 parts. The total additional and reaction time is 1¼ hours, and the maximum temperature is 65° C. The product is filtered, washed with water and dried for five days at 60° C. There is obtained 250 parts of product which has a molecular weight of 891 and contains 5.42% nitrogen.

The compositions of this invention may be polymerized either alone or in combination with other polymerizable unsaturated substances, to produce thermoset compounds useful in a wide variety of ways. For example, these compositions may be used to prepare molding powders which can be formed into articles with improved impact resistance, heat distortion and chemical resistance.

For the preparation of such molding powders, the thermosetting compositions of this invention are combined with a minor amount of a polymerization catalyst and, optionally, such other ingredients as pigments, inhibitors and mold release agents. The molding powders may also contain other resinous components such as unsaturated polyesters or crosslinking monomers such as styrene, alkyl acrylates, acrylamides, diallyl phthalate and the like. A particularly preferred species of molding powder contains, as resinous ingredients, the thermosetting composition of this invention and an unsaturated polyester. In such a powder, the two resinous components may be used in any desired proportions so that the final composition is predominately polyester or predominately the thermosetting composition of this invention. In particular, the composition of this invention may comprise about 1–99% of the total resin in the powder, and preferably at least about 5%. An additional monomeric crosslinking agent may also be present, but is frequently not necessary and may be undesirable when a free-flowing powder is required.

In general, an unfilled molding powder will contain a major amount of resinous constituent in combination with about 0.5–1.5% by weight of each of a polymerization catalyst and a mold release agent. Typical polymerization catalysts are the free radical catalysts such as t-butyl perbenzoate, benzyl peroxide, t-butyl percrotonate, 2,5 - dimethylhexane-2,5-diperoctoate and the like. It is sometimes advantageous to employ as a polymerization catalyst a solution of the peroxy compound in a plasticizer such as dioctyl phthalate. The substances useful as mold release agents are well known in the art and include, for example, zinc stearate and stearic acid.

Filled molding powders contain, in addition to the resin and the other ingredients enumerated above, an inert, particulate filler in an amount up to about 75% by weight, usually about 25–75%. Typical fillers are cotton flock, cellulose flock, wood flour, asbestos fiber, glass fiber, asbestos shorts, Asbestine, cellulose and slate flour. A portion of the polymer and/or filler (up to about 25% by weight) may be replaced by a suitable pigment such as titanium dioxide.

Molding powders of this invention which contain an unsaturated polyester are frequently superior to previously known alkyd molding powders in ease of processing. Many alkyd molding compositions containing crosslinking monomers such as diallyl phthalate are tacky "gunks" requiring hand operations or complicated machinery for processing. For example, these compositions frequently cannot be granulated without refrigeration since they agglomerate at room temperature. They are agglomerate in storage, making them unusable in ordinary automatic feed equipment. The substitution of the thermosetting composition of this invention for diallyl phthalate results in a molding powder which is free-flowing and is therefore easier to handle.

In preparing the molding compositions of this invention, the dry ingredients are blended, preferably with milling to attain a small particle size. The ingredients may be prewet with water, alcohol or other suitable liquid until a semi-fluid mixture is obtained, then mixed and allowed to dry. Blending is best accomplished in a high-efficiency apparatus such as a ball mill, Waring Blendor or the like.

The following examples illustrate the preparation of molding powders of this invention.

EXAMPLES 12–19

The ingredients indicated in Table I are dry-mixed and powdered in a ball mill, Hobart mixer, 2-roll mill or the like to form a uniform mixture.

TABLE I

| | Parts by weight | | | | | | | |
|---|---|---|---|---|---|---|---|---|
| Example | 12 | 13 | 14 | 15 | 16 | 17 | 18 | 19 |
| Ingredients: | | | | | | | | |
| Monomer: | | | | | | | | |
| Product of Ex. 4 | | | | | 125 | 125 | 125 | 127 |
| Product of Ex. 5 | 110 | 125 | | 125 | | | | |
| Product of Ex. 9 | | | 125 | | | | | |
| Diacetone acrylamide | 150 | | | | | | | |
| Filler: | | | | | | | | |
| Cellulose flock | 140 | | | | | | | |
| Cotton flock | | 70 | 70 | | 70 | | | 68 |
| Wood flour | | | | 75 | | | 70 | |
| α-Cellulose | | | | | | 70 | | |
| Catalyst: | | | | | | | | |
| Benzoyl peroxide [1] | 8 | | | | | | | |
| t-Butyl perbenzoate | | 2 | 2 | 2 | 2 | 2 | 2 | 2 |
| Mold release agent: | | | | | | | | |
| Stearic acid | 4 | | | | | | | |
| Zinc stearate | | 2 | 2 | 2 | 1.5 | 1.5 | 1.5 | 2 |
| Pigment: Titanium dioxide | | | | | | | | 47 |

[1] 50% solution in dioctyl phthalate.

Similar molding powders may be prepared using as fillers asbestos shorts or asbestos fiber. Likewise, satisfactory molding powders may be prepared containing equal weights of diacetone acrylamide-formaldehyde reaction product and filler.

EXAMPLE 20

To a slurry of 125 parts of the product of Example 4 in 200 parts of hot water is added 70 parts of cotton flock; the ingredients are then agitated in a Hobart mixer until the mass is homogeneous. The water is allowed to evaporate and 1.5 parts of zinc stearate and 2 parts of t-butyl perbenzoate are added, after which the mixture is milled in a ball mill for about one hour.

EXAMPLE 21

A solution of 150 parts of the product of Example 4 in 60 parts of methanol is prepared, and 175 parts of this solution is placed in a Hobart mixer and mixed with 70 parts of cotton flock. The mixture is allowed to air dry, after which 1.5 parts of zinc stearate and 2 parts of t-butyl perbenzoate are added and the mass is milled in a ball mill for about one hour.

EXAMPLE 22

An unfilled molding powder is prepared by mixing 148 parts of the product of Example 3, 0.74 part of 2,5-di-t-butylhydroquinone and 1.33 parts of zinc stearate, milling on a 2-roll mill for 30 minutes at 138° C., and then transferring to a Waring Blendor and adding 1.3 parts of t-butyl percrotonate.

EXAMPLES 23–30

Masterbatches of resin, pigment, and catalysts are prepared as listed in Table II. In each case, the resin and titanium dioxide are mixed for about 45 seconds in a Waring Blendor, after which time the catalyst is added portionwise with continued mixing. After all of the ingredients have been added, mixing is continued for 30 seconds.

TABLE II

| Masterbatch | Parts by weight I | II | III | IV | V |
|---|---|---|---|---|---|
| Ingredients: | | | | | |
| Product of Example 3 | 600 | 600 | 600 | 340 | 300 |
| Titanium dioxide | 31 | 31 | 31 | 18 | 15 |
| t-Butyl perbenzoate | 9.6 | | | 5.9 | 2.7 |
| t-Butyl percrotonate | | | 9.6 | | |
| 2,5-dimethylhexane-2,5-diperoctoate | | 9.6 | | | |

The masterbatch is then removed from the Waring Blendor and mixed with filler and mold release agent for 15 minutes. The molding compositions listed in Table III are prepared by this method.

TABLE III

| Example | Parts by weight 23 | 24 | 25 | 26 | 27 | 28 | 29 | 30 |
|---|---|---|---|---|---|---|---|---|
| Ingredients: | | | | | | | | |
| Masterbatch I | 600 | | 500 | | | | | |
| Masterbatch II | | 220 | | | | | | 300 |
| Masterbatch III | | | | 350 | 220 | | | |
| Masterbatch IV | | | | | | 340 | | |
| Masterbatch V | | | | | | | 210 | |
| Cotton flock | 322 | 140 | 440 | 307 | | 182 | 112 | 262 |
| Sisal flock | | | | | 204 | | | |
| Zinc stearate | 9 | 4 | 9 | 7 | 4 | 5 | 3 | 6 |

EXAMPLES 31–32

These products are prepared by mixing, respectively, 480 parts of the product of Example 23 and 455 parts of the product of Example 25 with 0.15 part of 2,5-di-5-butylhydroquinone inhibitor and dry-mixing for 15 minutes.

EXAMPLES 33–34

A masterbatch is prepared from 600 parts of the product of Example 3, 31 parts of titanium dioxide, 0.3 part of 2,5-di-t-butyl hydroquinone and 9.6 parts of t-butyl percrotonate, following the procedure of Example 21. Two molding powders are then prepared from this masterbatch by dry-mixing the ingredients for 15 minutes. These molding powders are constituted as shown in Table IV.

TABLE IV

| Example | Parts by weight 33 | 34 |
|---|---|---|
| Ingredients: | | |
| Masterbatch | 280 | 300 |
| Cotton flock | 242 | |
| Sisal fiber | | 276 |
| Zinc stearate | 5 | 6 |

EXAMPLES 35–39

An isophthalate-based polyester is dry-blended with the product of Example 2, and catalyst, mold release agent and filler are added in the proportions shown in Table V. In Examples 38 and 39, diallyl phthalate is also present. The resulting compositions are milled and granulated at 140–220° F.

TABLE V

| Example | Parts by weight 35 | 36 | 37 | 38 | 39 |
|---|---|---|---|---|---|
| Ingredients: | | | | | |
| Polyester | 25.3 | 22.3 | 19.3 | 22.3 | 25.3 |
| Product of Example 2 | 3.0 | 6.0 | 9.0 | 3.0 | 1.5 |
| Diallyl phthalate | | | | 3.0 | 1.5 |
| t-Butyl perbenzoate | 0.6 | 0.6 | 0.6 | 0.6 | 0.6 |
| Zinc stearate | 1.1 | 1.1 | 1.1 | 1.1 | 1.1 |
| Slate flour | 70.0 | 70.0 | 70.0 | 70.0 | 70.0 |

The compositions of Examples 35–37 were free-flowing after three days storage at 75° F., while similar compositions containing diallyl phthalate in place of the product of Example 2 were agglomerated under the same conditions as were the compositions of Examples 38 and 39.

EXAMPLES 40–42

Masterbatches with the constitution shown in Table VI are prepared by blending the resinous components at high speed and subsequently adding the other ingredients.

TABLE VI

| Example | Parts by weight 40 | 41 | 42 |
|---|---|---|---|
| Ingredients: | | | |
| Product of Example 2 | 351 | 231 | 100 |
| Isophthalate-based curable polyester resin | 108 | 228 | 321 |
| 0.393% solution of violet dye in diallyl phthalate | 12 | 12 | |
| t-Butyl perbenzoate | 5 | 5 | 5 |
| 2,5-dimethylhexane-2,5-diperoctoate | 5 | 5 | 5 |
| Zinc stearate | 19 | 19 | 19 |

For the preparation of molding powders, 420 parts of each of the masterbatches is blended with 170 parts of titanium dioxide, 260 parts of α-cellulose and 282 parts of Asbestine. Following thorough blending, the powders are rolled on a 2-roll mill at a front roll temperature of 65° and a back roll temperature of 82° C. The finished powders are suitable for molding, e.g., at about 150° C.

EXAMPLE 43

A masterbatch is prepared by blending 260 parts of the polyester resin of Examples 35–42, 23 parts of the product of Example 2, 23 parts of diacetone acrylamide, 23 parts of diallyl phthalate, 7 parts of t-butyl perbenzoate and 13 parts of zinc stearate. A molding powder is then prepared by blending 330 parts of the masterbatch with 770 parts of slate flour. This material is milled in a two-roll mill at a front roll temperature of 54° C. and a back roll temperature of 82° C., and is then suitable for molding, e.g., at temperature of 140–160° C.

For the preparation of molded articles, the molding powders of this invention are heated in the mold under polymerization conditions until they have "set." The temperature and pressure depend to some extent on the ingredients of the molding powder; thus, lower temperatures (about 100° C. maximum) will be necessary for a molding powder containing monomers which impart thermoplastic properties to the product. If the only polymerizable ingredients in the molding powder are the thermosetting composition of this invention and an unsaturated polyester, temperatures of about 100–200° C., and preferably about 140–160° C., are suitable. Molding pressures will generally vary between about 500 and 5000 p.s.i. In some instances molding may be started at room temperature, but usually it is preferred to preheat the mold to the desired temperature before introducing the molding powders.

Samples of the molding powders of this invention were molded under the conditions listed in Table VII. A sheet, 7 inches square, was prepared from each composition.

TABLE VII

| Product of Example— | Molding conditions Temp., ° C. | Pressure, p.s.i. | Time, min. |
|---|---|---|---|
| 12 | 25–93 | 1,000 | 15 |
| 13 | 25–143 | 1,000 | 15 |
| 14 | 25–143 | 1,000 | 15 |
| 15 | 152 | 1,000 | 15 |
| 16 | 152 | 600 | 4 |
| 17 | 152 | 600 | 4 |
| 18 | 152 | 600 | 4 |
| 19 | 152 | 600 | 4 |
| 20 | 152 | 600 | 4 |
| 21 | 152 | 600 | 4 |
| 22 | 160 | 1,000 | 2 |
| 23–30 | 154 | 1,200 | 4 |
| 35–39 | 152–160 | 4,000 | 1 |

The molding powders of Examples 31, 32 and 34 were predensified by molding at 120° C. and 1200 p.s.i. pressure, and the product of Example 33 was similarly predensified at 100–105° C. The predensified compositions were then powdered and molded again at 154° C. and 1200 p.s.i. for four minutes.

The molded sheets prepared from the molding powders of this invention were tested for flexural strength and modulus, impact and heat deflection. The test methods used were ASTM methods; D790 for flexural strength and modulus, D256 for impact (on a notched sample), and D648 for heat deflection. The results are given in Table VIII.

TABLE VIII

| Example | Flexural strength, p.s.i. | Modulus, p.s.i.×10⁵ | Impact, ft.-lb./in. | Deflection temp., ° C. |
|---|---|---|---|---|
| 12 | 5,400 | 5.4 | 0.44 | 94 |
| 13 | 5,570 | 7.9 | 0.56 | 220 |
| 14 | 7,940 | 8.7 | 0.70 | 190 |
| 15 | 6,320 | 8.6 | 0.25 | 227 |
| 16 | 10,200 | 11 | 0.84 | 225 |
| 17 | 8,400 | 10 | 0.45 | 222 |
| 18 | 7,400 | 9 | 0.33 | 219 |
| 19 | 9,400 | 11 | 0.27 | 225 |
| 20 | 10,900 | 12 | 0.67 | 218 |
| 21 | 10,500 | 11 | 0.83 | 218 |
| 23 | | | 0.83 | 207 |
| 25 | | | 1.02 | 217 |
| 26 | | | 1.15 | 208 |
| 27 | | | 3.47 | 192 |
| 28 | | | 0.78 | 220 |
| 33 | | | 0.95 | 203 |
| 34 | | | 2.89 | 205 |
| 35 | 9,600 | 25.3 | | 231 |
| 36 | 8,100 | 24.9 | | 232 |
| 37 | 8,000 | 25.9 | | 240 |
| 38 | 7,600 | 24.4 | | 233 |
| 39 | 8,700 | 23.7 | | 220 |

To evaluate chemical resistance of molded articles prepared from the molding powders of this invention, the molded sheet prepared from the product of Example 22 was broken into small pieces, weighed and placed in the desired test solution for 90 hours at room temperature. The pieces were then removed, washed and dried and reweighed. The percentage weight increase was calculated. When evaluated by this method, the product of Example 22 showed a weight increase of 1.18% in water, 1.31% in 10% sodium hydroxide solution, 1.26% in 10% sulfuric acid solution, and 0.09% in benzene.

Another application for the compositions of this invention is as a replacement for unsaturated polyester resins in the formation of articles such as glass fiber reinforced mats. This reaction involves a crosslinking of the polymeric compositions of this invention by means of a suitable curing agent, typically styrene. However, because of the limited solubility of the diacetone acrylamide-formaldehyde reaction product in styrene, it is generally more convenient to cure the composition with a mixture of styrene and a solubilizing monomer such as acrylonitrile.

For the preparation of cured articles, a solution of the composition of this invention in the curing agent is typically reacted with a free radical catalyst or a drier; typical catalysts and driers include peroxides such as methyl ethyl ketone peroxide, cobalt salts of organic acids, and amines such as diethylaniline. The solution may also contain comonomers such as vinyl acetate, ethyl acrylate, acrylamide or diacetone acrylamide.

The following examples illustrate the use of compositions of this invention as replacements for polyesters.

EXAMPLE 44

To a solution of 5 parts of styrene of 0.125 part of an organic solution of cobalt naphthenate containing 6% cobalt is added 15 parts of the product of Example 8 and 5 parts of acrylonitrile. The mixture is stirred until homogeneous, after which 0.25 part of a 60% solution of methyl ethyl ketone peroxide is added. The system gels within about 2 hours, and cures after about 30–48 hours at room temperature. A sample of the resinous material, upon treatment with water for 120 hours at room temperature, shows a weight increase of 1.94%.

A similar composition is prepared in which 15 parts of the product of Example 3 replaces the product of Example 8. The resinous material prepared therefrom exhibits a weight increase of 1.45%.

EXAMPLE 45

A solution of 100 parts of the product of Example 8 in 40 parts of acrylonitrile is mixed with a solution of 1.9 parts of a cobalt naphthenate composition containing 6% cobalt in 100 parts of styrene. The liquid resin thus prepared is mixed with 1% by weight of 60% methyl ethyl ketone peroxide solution and is used to impregnate a fiberglass mat (the amount of resin used being 3 times the weight of the mat). The resin-impregnated mat is placed between two sheets of cellophane and air bubbles are worked out; the resin is then allowed to cure and is finally annealed by heating to 80° C. over 8 hours and then cooling. The resulting mat having a thickness of 0.09 inch has a tensile strength of 11,200 p.s.i.

A similar mat prepared from the product of Example 3 has an average tensile strength of 8,250 p.s.i.

EXAMPLE 46

To 234 grams of a solution of 3.5 parts (by weight) of the product of Example 3 in 1 part of acrylonitrile is added 24 grams of acrylonitrile and a solution of 1.75 grams of cobalt naphthenate (6% cobalt) and 0.7 gram of diethylaniline in 93 grams of styrene. To the mixture is added 1.5% by weight of 60% methyl ethyl ketone peroxide, and the resin is then used to impregnate a 9 x 10-inch fiberglass mat. The weight of resin used is three times the weight of the mat.

The system is allowed to gel and cure at room temperature. The mat thus obtained has an average flexural strenpth of 22,300 p.s.i., a flexural modulus of $7.3\times10^5$ p.s.i. and a Shore D hardness of 89.

A similar porduct is prepared in which 47 grams of the styrene is replaced by 47 grams of diacetone acrylamide. The product has a flexural strenpth of 20,800 p.s.i., a flexural modulus of $7.2\times10^5$ p.s.i. and a Shore D hardness of 88.

Still another use for the compositions of this invention is in the preparation of decorative and structural laminates. For this purpose, solutions of the thermosetting composition may be prepared and used to impregnate paper, non-woven fabric, fiberglass and the like. In the presence of a suitable polymerization catalyst which is also dissolved in the resin solution, the laminated article cures to form a strong, chemically resistant article. For example, a 50–60% solution in a mixture of isopropyl alcohol and acetone of the product of Example 6 may be prepared and 2% by weight of t-butyl perbenzoate added thereto. Strips of reinforcing material, such as paper, may then be impregnated with the solution, sandwiched together (to a total of up to 10 plies) and dried. The resulting laminates may then be molded to hardboard or plywood, with or without overlays.

What is claimed is:

1. A process for preparing a thermosetting polymeric composition of matter which comprises reacting, in a strongly alkaline medium, an aliphatic aldehyde containing no more than four carbon atoms with an N-3-oxohydrocarbon-substituted acrylamide of the formula

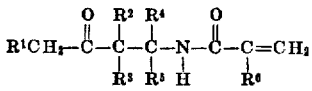

wherein each of $R^1$, $R^2$, $R^3$, $R^4$ and $R^5$ is individually hydrogen or a hydrocarbon radical and $R^6$ is hydrogen or a lower alkyl radical, the molar ratio of said aldehyde to said N-3-oxohydrocarbon-substituted acrylamide being between abut 1:1 and 8:1, and allowing the reaction to proceed until a *water-insoluble* polymeric product is formed.

2. The process of claim 1 wherein the aldehyde is formaldehyde.

3. The process of claim 2 wherein each of $R^1$, $R^2$, $R^3$, $R^4$ and $R^5$ is hydrogen or a lower alkyl radical and $R^6$ is hydrogen.

4. The process of claim 2 wherein the N-3-oxohydrocarbon-substituted acrylamide is N-(1,1-dimethyl-3-oxobutyl)-acrylamide.

5. The process of claim 4 wherein the strongly alkaline medium is an aqueous or potassium hydroxide or quaternary ammonium hydroxide solution.

6. The process of claim 5 wherein the strongly alkaline medium is a sodium hydroxide solution.

7. A *water-insoluble* thermosetting polymeric composition of matter prepared by the method of claim 1.

8. *A water-insoluble thermosetting* [Thermosetting] polymeric composition of matter prepared by the method of claim 2.

9. A *water-insoluble* thermosetting polymeric composition of matter prepared by the method of claim 4.

10. A composition of matter which comprises (A) a resinous component consisting of about 1–100% of the composition of claim 7 with the balance being an unsaturated polyester resin, and (B) a minor amount of a polymerization catalyst.

11. A composition of matter which comprises (A) a resinous component consisting of about 1–100% of the composition of claim 9, with the balance being an unsaturated polyester resin, and (B) a minor amount of a polymerization catalyst.

12. A composition according to claim 11 wherein component A consists entirely of the composition of claim 8.

13. A composition according to claim 11 which additionally contains a crosslinking monomer.

14. A composition according to claim 13 wherein the crosslinking monomer is styrene or diallyl phthalate.

15. A composition according to claim 11 which additionally contains an inert, particulate filler.

16. A composition according to claim 12 which additionally contains an inert, particulate filler.

17. A composition according to claim 14 which additionally contains an inert, particulate filler.

18. A thermoset article formed by curing the composition of claim 11 under thermosetting conditions.

19. A thermoset article formed by curing the composition of claim 12 under thermosetting conditions.

20. A thermoset article formed by curing the composition of claim 15 under thermosetting conditions.

21. A thermoset article formed by curing the composition of claim 16 under thermosetting conditions.

References Cited

The following references, cited by the Examiner, are of record in the patented file of this patent or the original patent.

UNITED STATES PATENTS

| | | | |
|---|---|---|---|
| 3,277,056 | 10/1956 | Coleman | 260—80.73 |
| 3,425,942 | 2/1969 | Coleman | 260—80.3 |
| 3,454,669 | 7/1969 | Laudise | 260—830 |
| 3,497,467 | 2/1970 | Coleman | 260—65 |

PAUL LIEBERMAN, Primary Examiner

U.S. Cl. X.R.

161—194, 195, 198, 232; 260—13, 16, 17 CL, 17 R, 32.8 N, 33.2 R, 33.4 R, 37 N, 37 R, 40 R, 41 R, 41 AG, 64, 65

UNITED STATES PATENT OFFICE
CERTIFICATE OF CORRECTION

Patent No. Re. 27,328 Dated April 11, 1972

Inventor(s) John Wesley Forsberg

It is certified that error appears in the above-identified patent and that said Letters Patent are hereby corrected as shown below:

Column 10, line 68, for "abut" read --about--. Column 11, line 5, after "aqueous" insert --sodium--.

Signed and sealed this 1st day of August 1972.

(SEAL)
Attest:

EDWARD M.FLETCHER,JR.
Attesting Officer

ROBERT GOTTSCHALK
Commissioner of Patents